United States Patent [19]
Rysti

[11] 4,358,009
[45] Nov. 9, 1982

[54] METHOD AND APPARATUS FOR SORTING TIMBER PIECES

[76] Inventor: Alpo Rysti, Friisiläntie 36, 02240 Espoo 24, Finland

[21] Appl. No.: 204,898

[22] Filed: Nov. 7, 1980

[30] Foreign Application Priority Data

Nov. 16, 1979 [FI] Finland ............................... 793606

[51] Int. Cl.³ .................... B65G 47/50; B65G 17/34; B07C 5/36
[52] U.S. Cl. .................................. 198/365; 198/370; 198/680; 209/517; 209/521
[58] Field of Search ............... 209/517, 521, 518, 912; 198/365, 366, 370, 645, 680, 477, 484, 796

[56] References Cited

U.S. PATENT DOCUMENTS

| | | | |
|---|---|---|---|
| 3,116,835 | 1/1964 | Brandon | 209/521 X |
| 3,581,891 | 6/1971 | Rysti | 198/365 |
| 3,700,120 | 10/1972 | Romick et al. | 209/517 X |
| 4,185,733 | 1/1980 | Heikinheimo | 198/680 X |

*Primary Examiner*—Robert B. Reeves
*Assistant Examiner*—Edward M. Wacyra
*Attorney, Agent, or Firm*—Steinberg & Raskin

[57] ABSTRACT

Method and apparatus for sorting timber pieces as the same are transversely conveyed include for each timber piece, pairs of supporting members, each including a hook arm and an adjacent straight arm supported by a respective support member mounted on the conveyor. The straight arm forms a part of an angular arm member which is supported both on the support member to which the hook arm is fixed and to the support member which precedes that support member in the direction of travel of the conveyor. The timber pieces are dropped in accordance with a preset program through the movement of the hook and straight arms relative to each other.

14 Claims, 4 Drawing Figures

METHOD AND APPARATUS FOR SORTING TIMBER PIECES

BACKGROUND OF THE INVENTION

This invention relates to methods and apparatus for sorting timber pieces and, more particularly, to methods and apparatus for sorting timber pieces while the same are transversely transported on a conveyor on which the timber pieces are supported by consecutively arranged pairs of supporting members arranged in side-by-side fashion and from which the timber pieces are dropped in accordance with a preset program at depositing sites according to desired characteristics.

Timber sorting apparatus which have proven to be highly advantageous relative to most conventional sorting apparatus are disclosed in applicant's Finnish Pat. No. 44 783. The method and apparatus disclosed in this patent are advantageous in that the timber pieces are transported in a manner such that the supporting structure is subjected to only a minor torque and are therefore well adapted to handle even heavy timber pieces. The timber supporting pieces can be spaced more closely to each other than in conventional apparatus even where timber pieces having a great breadth are being handled so that high outputs are obtained even when the conveyer is run at a relatively low speed.

However, there are certain disadvantages inherent in the construction and operation of the timber sorting apparatus as disclosed in Finnish Pat. No. 44 783. More particularly, in the apparatus disclosed in the Finnish patent, the timber piece is held by a hook-like member which is connected to a fixed arm member. However, this construction has the drawback that in order to accommodate variations in the length of the timber pieces, it is necessary in practice to normally use four or five groups of such members and, consequently, four or five triggering devices are required in order to actuate the hook-like member during the sorting procedure. If only a single triggering device is to be sufficient, it is necessary to interconnect all of the hook-like members with a single connecting shaft which itself is actuated by a single triggering device. In this situation, however, two separate shafts at each dropping station are required, namely one which is fixed and one which is rotatable. Of course, this necessity renders the apparatus relatively expensive and, additionally increased the distance between adjacent timber pieces.

SUMMARY OF THE INVENTION

Accordingly, one object of the present invention is to provide new and improved methods and apparatus which operate according to substantially the same principle as disclosed in the above-mentioned Finnish patent and so as to have the same advantages as the methods and apparatus disclosed therein.

Another object of the present invention is to provide a new and improved method and apparatus wherein the spacing between adjacent timber pieces can be reduced even further so as to increase the capacity of the apparatus. In this connection, sorting at a rate of 200 pieces per minute with a chain speed of 1 meter per second is contemplated.

Still another object of the present invention is to provide a new and improved method and apparatus for sorting timber pieces which is less complex and less expensive than the apparatus disclosed in Finnish Pat. No. 44 783.

Briefly, in accordance with the present invention, these and other objects are obtained by providing that on a sorting conveyer the timber pieces are carried by means of pairs of supporting arms, each pair including a hook arm and a straight arm, both of these arms being carried or supported on the same supporting shaft which is associated with the sorting conveyer. Each straight arm comprises a part of an angular arm member which itself is further supported at a stem portion thereof at another point of support on the conveyer, and, in particular, is supported for free movement on the support shaft which precedes the first-mentioned support rod in the direction of travel of the timber pieces.

The dropping of the timber pieces is accomplished by moving the hook and/or straight arms with respect to each other through the rotation of the support shaft which supports both the hook and straight arms.

Apparatus according to the present invention includes a plurality of elongate support members mounted on the conveyer extending transversely to the direction of travel of the conveyer and which are freely rotatable about their respective longitudinal axes. Pairs of adjacent hook and straight arms are supported by each of the support members, the hook arms having at their lower ends stop portions which support an edge of a timber piece. The hook arms are fixedly connected to the respective support members. The support members are rotated by conventional devices which are known per se in the art whereby the hook arms fixed thereto are rotated. Each straight arm comprises a part or extension of an angular arm member which includes a stem portion having a free end mounted for free rotation, an angular portion extending from the stem portion and the straight arm mentioned above which extends from the angular portion into operative engagement with a corresponding one of the hook arms. The angular portion is supported by the support member to which the hook arms are fixed while the free end of the stem portion is mounted for free rotation on the support member which precedes the first mentioned support member in the direction of travel of the timber pieces.

The timber pieces are dropped or sorted according to a program at predetermined stations, such as compartments or pallets, and by this method a wide variety of dropping arrangements can be obtained which are determined by the weight of the timber pieces being handled, their surface quality, length, etc.

Apparatus according to the present invention have a simple construction since the same support member serves as the means by which one of the arms, i.e., the hook arms can be turned as well as the means by which the other arm, i.e., the straight arm is supported. Thus, the same advantageous transport of timber pieces is obtained by the present invention as in the case of the apparatus disclosed in Finnish Pat. No. 44783, yet at the same time eliminating the requirement for the provision of two shafts, i.e., separate fixed and rotatable shafts, but only a single triggering device is utilized.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
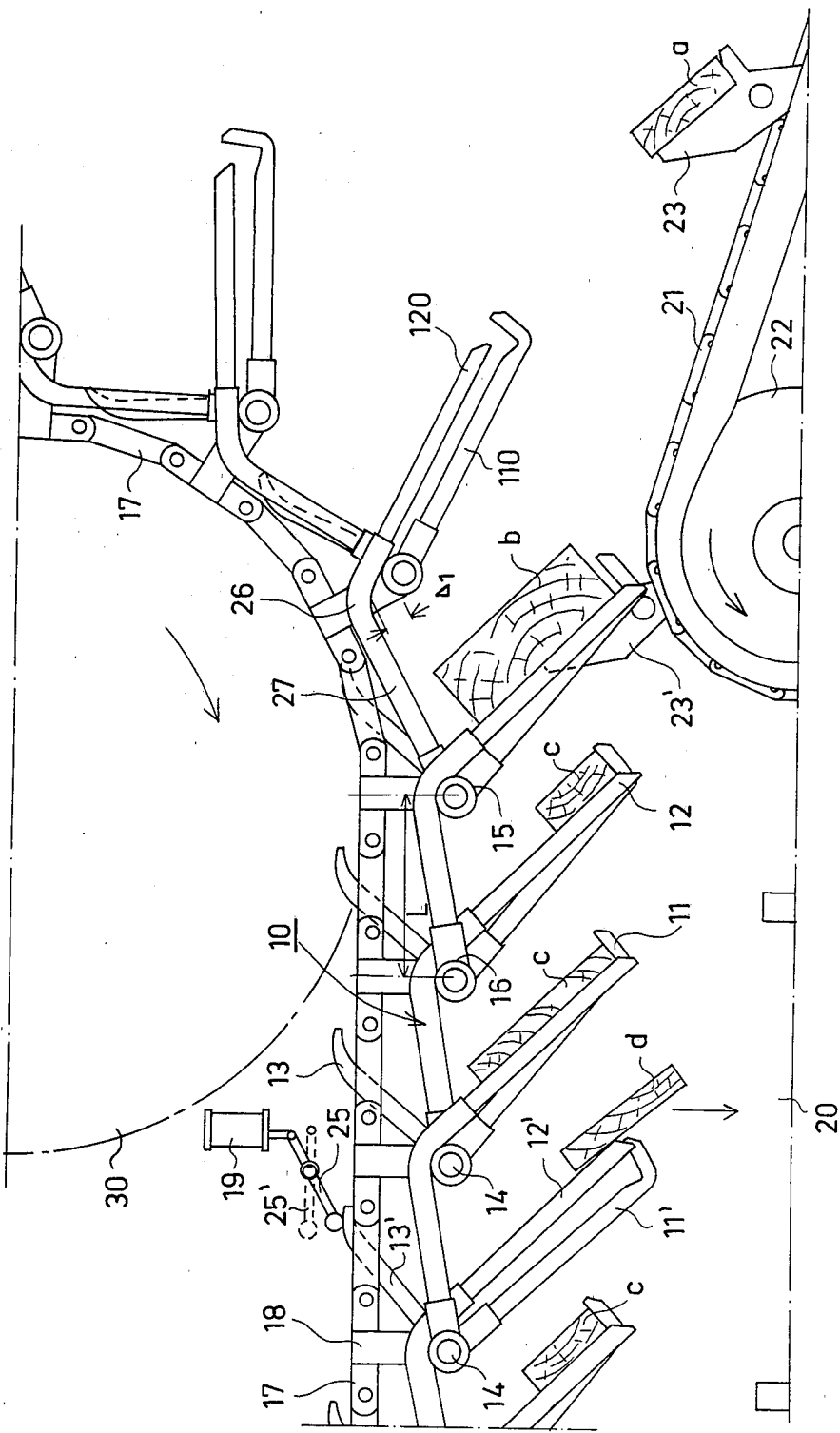
FIG. 1 is an elevational view of a portion of apparatus according to the present invention which carries out the method of the present invention.
Figure 4:
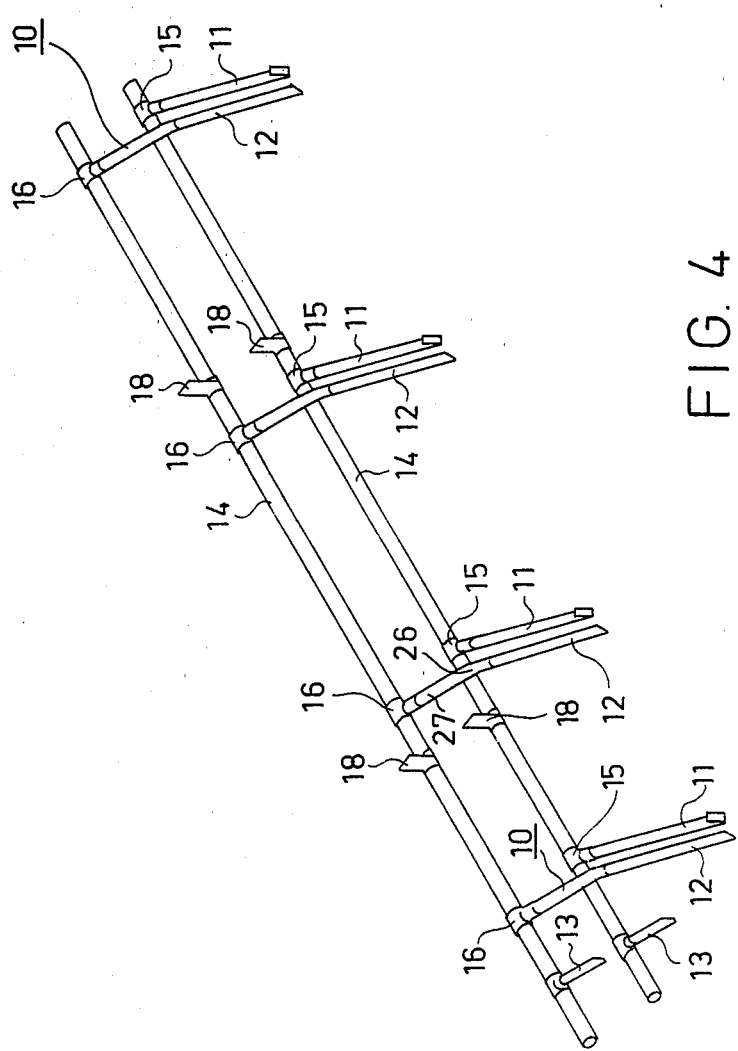
FIG. 4 is a perspective view illustrating a pair of support members and associated hook arms and angular arm members as well as additional structure in accordance with the present invention.

Referring now to the drawings wherein like reference characters designate identical or corresponding parts throughout the several views, and more particularly to FIGS. 1 and 4, the timber sorting apparatus of the present invention is incorporated in an endless conveyer including return wheels 30 on which are disposed a set of conveyer chains 17 (only one shown) in side-by-side fashion. A plurality of sorting compartments or stations 20 are situated beneath the conveyer into which the timber pieces are dropped from the conveyer in accordance with a preselected program determined by their type, quality, etc.

Another conveyer is provided in order to feed the timber pieces onto the sorting conveyer described above. This feeding conveyer comprises return wheels 22, endless conveyer chains 21 carried by the wheels 22 and a plurality of timber supports 23 in which timber pieces a are transversely fed in a sequential manner to the sorting conveyer.

A plurality of elongate support members in the form of shafts 14 are mounted on the conveyer chains 17 so as to extend transversely to the direction of travel of the conveyer and so as to be substantially equally spaced from one another by a distance L in the direction of travel. The shafts 14 are freely rotatable about their respective longitudinal axes by means of being mounted within sleeves 16 which are fixed to the lower ends of brackets 18 which are fixed to the chains 17 at equally spaced intervals as described above.

Angular arm members 10 are mounted on the support shafts 14 by means of sleeves 16 so as to be freely rotatably carried thereby. Each angular arm member 10 comprises a straight stem portion 27 which extends from the sleeve 16, an angular portion 26 which extends from the stem portion 27 and a straight supporting arm 12. As seen in FIGS. 1 and 4, the angular portion 26 of each angular arm member 10 rests upon a support shaft 14 which follows the support to which the angular arm member is rotatably mounted by sleeves 16 so that the succeeding shaft 14 supports the angular arm member. The straight arm 12 extends downwardly and towards the rear at an angle of about 45°.

Hook arms 11 are rigidly mounted at their top ends by means of sleeves 15 to respective support shafts 14 and, as best seen in FIG. 4, each hook arm 11 is mounted in operative adjacent relationship to a respective straight arm 12. Each hook arm 11 has a stop portion at its lower end which extends upwardly and rearwardly. In this manner, each pair of adjacent hook and straight arms 11, 12 present surfaces which engage respective edges of a timber piece and comprise support members whereby the timber piece is transversely supported as the same is conveyed.

The above-described apparatus operates in the following manner. Referring to FIG. 1, the sets of hook and straight arms arrive at a position designated 110, 120, respectively, wherein the angular portion 26 from which the straight arm 120 extends is located at a distance $\Delta_1$ from the upper surface of the support shaft to which hook arm 110 is fixed. The cooperating pair of supporting arms are then in a position wherein the timber piece a being carried on the feed conveyer 21, 22 will be delivered onto the pair of supporting arms to be carried thereby. In FIG. 1 a timber piece b carried on a set of supports 23' is illustrated at the moment immediately after the same has been delivered onto a set of supporting arms. In this connection, it is seen that the two arms 11 and 12 have turned so as to cause the stop portion on the lower end of the hook arm 11 to retain the timber piece b. The timber piece b is preferably further supported by the straight arm 12.

The timber pieces c carried by the sets of supporting arm pairs are transported to positions above sorting compartments 20 whereupon the same are dropped at an appropriate time according to a preselected program. For example, as illustrated in FIG. 1, the timber piece d is being dropped at its illustrated position. Such dropping action is accomplished through the movement of the hook and straight arms 11' and 12' relative to each other in a manner such that the stop portion at the bottom of the hook arm 11' is withdrawn behind the straight arm 12' so as to eliminate any support for the timber piece d allowing the same to drop into its appropriate compartment.

The rotation of the hook arms 11' is accomplished through the provision of apparatus for rotating the support shaft 14 to which the hook arms 11' are rigidly connected. More particularly, an arm 13' is rigidly fixed to the shaft 14 and extends upwardly between the chains 17 as seen in FIG. 1. A stop 25 actuated by a power cylinder 19 through conventional control means is adapted to move against the arm 13' from the position 25' when the timber piece d is located over compartment 20. In this manner, the timber piece d is dropped to its respective compartment. It is of course understood that during the rotation of the support shaft 14 during the dropping operation described above, the angular arm member 10 mounted on the rotating support shaft 14 will not move since the support shaft 14 can freely rotate within the sleeve 16.

In the illustrated embodiment, the hook arms 11 are maintained in their transporting position, i.e., in the position wherein they carry timber pieces designated c in FIG. 1, by means of the friction forces created between the angular arm member 10 engaging the support shafts 14 to which the hook arms 11 are rigidly connected. Thus, the hook arms 11 are prevented from turning downwardly while in their transporting position by the friction force exerted by the angular arm member 10 which is resting on the support shaft 14 to which the hook arm is rigidly connected. It should be understood that the hook arms can be maintained in their transporting position by other means such, for example, as suitable friction journaling, counterweights, springs, or the like.

Thus, in the embodiment of the invention illustrated in FIG. 1, during the dropping operation, the hook arms 11 are turned downwardly through the rotation of their support shafts 14 to which they are respectively mounted and which are in turn rotated through the action of turning rods 13, all while the straight arms 12 remain unturned. However, it should be understood that the removal of the support for the timber pieces during the dropping operation can be accomplished in other ways. for example, the apparatus can be adapted so that the straight arms 12 turn forwardly while the hook arms 11 remain stationary. This can easily be accomplished by providing a stop portion at the ends of the straight arms 12 thereby converting the same into hook arms while removing the stop portions from the hook arms 11, thereby in effect converting the same into straight arms. Such mode of operation is well suited for use in connection with the sorting of light-weight timber pieces.

Figure 2:
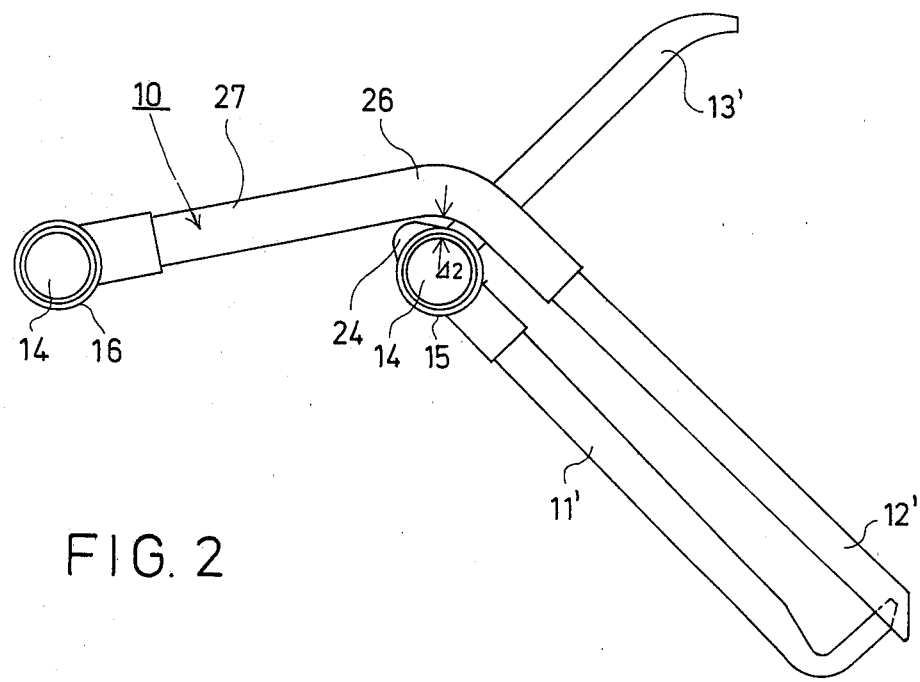
FIG. 2 is a detailed view illustrating a pair of supporting arms in their relative position wherein a timber piece is being dropped.

Further in this connection, another manner in which the dropping operation can be carried out is an arrangement wherein the straight arm 12 turns upwardly while the hook arm 11 turns downwardly. In this manner, the stop portion of the hook arm can be relocated rearwardly of the straight arm with the turning angles of arms 11 and 12 being extremely small. This mode of operation can be accomplished utilizing the embodiment of the apparatus illustrated in FIG. 2. In this connection the hook and straight arms 11' and 12' are shown after the timber piece has been released, i.e., after the hook arm 11' has moved to a small extent downwardly and the straight arm 12' moved to a small extent upwardly. The downward movment of the hook arms 11' is accomplished through a small rotation of the support shaft 14 in the same manner as described above. A cam 24 is provided on the support shaft 14 at a location such that when the support shaft 14 is rotated, the cam 24 will lift the angular portion 26 of the angular arm member 10 thereby turning the straight arm 12' upwardly, a clearance Δ₂ between the shaft 14 and the angular portion 26 being created.

Figure 3:
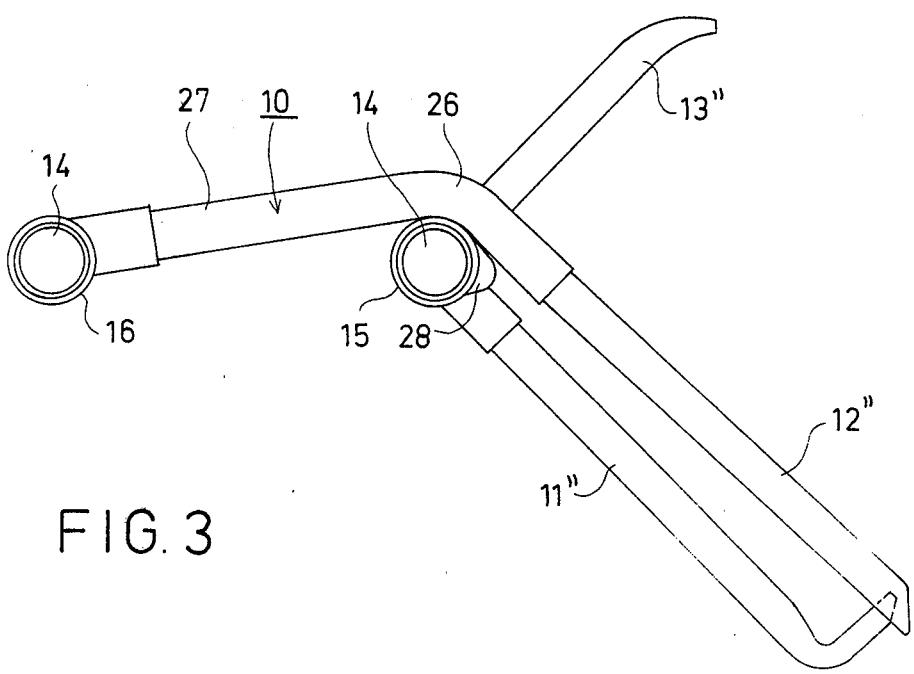
FIG. 3 is a view similar to FIG. 2 illustrating another embodiment of the apparatus of the present invention.

Referring to FIG. 3, an embodiment of the invention is illustrated wherein the dropping operation is accomplished through a downward rotation of the hook arm 11" and an additional downward rotation of the straight arm 12", the latter rotation being to a lesser extent than the former. In this manner, the stop portion of hook arm 11" is withdrawn rearwardly of the straight arm 12". Thus, referring to FIG. 3 a cam 28 is provided on the support shaft 14 at a position such that while in the transporting position, the angular portion 26 of the angular arm member 10 is engaged and supported by the cam 28 so that the angular portion 26 is in a raised position based from the shaft 14. Upon rotation of the support shaft 14 by the turning arms 13" as described above, the hook 11" will move downwardly and, simultaneously, the cam 28 will turn so that the angular portion 26 moves toward the support shaft 14 thereby allowing the straight arm 12" to move downwardly. At a certain point during the rotation of the support shaft 14, the angular portion 26 engages the shaft 14 so that as the hook arm 11" continues to turn downwardly, the straight arm 12" will remain stationary. In this manner, the pair of supporting arms 11" and 12" will attain a position illustrated in FIG. 3 wherein the timber piece is dropped therefrom.

Obviously, numerous modifications and variations of the present invention are possible in the light of the above teachings. It is therefore to be understood that within the scope of the claims appended hereto, the invention can be practiced otherwise than as specifically disclosed herein.

What is claimed is:

1. Apparatus for sorting timber pieces comprising: endless conveyer means; a plurality of elongate support members mounted on said conveyer means extending transversely to the direction of travel of said conveyer means, substantially equally spaced from one another in the direction of travel, and freely rotatable about their respective longitudinal axes; at least two hook arms fixed to each of said support members for rotation therewith, each hook arm having a stop portion at a free end thereof for supporting a timber piece; at least one angular arm member mounted on each of said support members, each angular arm member including a stem portion having a free end mounted for free rotation on a respective support member, an angular portion extending from said stem portion, and a straight arm extending from said angular portion into operative relationship with said hook arms fixed to a succeeding support member in the direction of travel of said conveyer means, said angular arm members being in supported engagement in the region of said angular portion thereof with said succeeding support members; and means for rotating each of said support members upon the same reaching a predetermined location along its path of travel to thereby rotate said hook arms fixed thereto relative to said straight arms.

2. The combination of claim 1 wherein at least two angular arm members are mounted for free rotation on each of said support members and wherein for each support member, each straight arm of an angular arm member mounted on a preceding support member is located adjacent to a respective hook arm fixed for rotation on said support member.

3. The combination of claim 2 wherein each pair of adjacent straight and hook arms are adapted to cooperate to support a timber piece along respective edges thereof.

4. The combination of claim 2 further including means for rotating each of said angular arm members upon a respective adjacent hook arm being rotated.

5. The combination of claim 4 wherein said rotating means for an angular arm member mounted on a support member is situated on the succeeding support member in the direction of travel of a conveyer means.

6. The combination of claim 5 wherein said rotating means comprises cam means provided on said support members adapted to engage said angular arm members upon rotation of said support members and hook arms fixed thereto in a downward direction for rotating the straight arm thereof in an upward direction.

7. The combination of claim 6 wherein said cam means are adapted to engage said angular portions of said angular arm members.

8. The combination of claim 5 wherein said rotating means comprise cam means provided on said support members adapted to engage said angular arm members while respective pairs of adjacent straight and hook arms are in a timber carrying or transporting position so that the angular portions of said angular arm members supported by said cam means are spaced from said supporting member, said cam means being formed such that upon rotation of said support member and hook arms fixed thereto in a downward direction, said cam means will rotate out of engagement with said angular arm members whereby said straight arm thereof will rotate in a downward direction over a relatively small distance.

9. A method of sorting timber pieces as the same are conveyed by a conveyer having a plurality of support members associated therewith which extend transversely to the direction in which the timber pieces are conveyed, comprising the steps of: supporting a plurality of timber pieces on the conveyer so that each extends transversely to the direction of conveyance, each timber piece being supported by pairs of supporting members, each pair comprising a hook arm and a straight arm of an angular arm member, the hook arm and angular arm member being supported on the same support member and the angular arm member being additionally supported on the support member of a preceding pair of supporting members in the direction of conveyance; conveying the timber pieces with each timber piece extending transversely to the direction in which it is being conveyed; and dropping each of the timber pieces at a selected location by moving the hook and straight arms relative to each other through rotation of the support member supporting the same.

10. The method of claim 9 wherein each hook arm is fixed on a respective support member and each angular arm member whose straight arm comprises a pair of supporting members with said hook member is freely turnably mounted on a preceding support member in the direction in which the timber pieces are being conveyed.

11. The method of claim 10 wherein said dropping step includes rotating a respective support member to rotate hook members fixed thereto while said straight arm remains fixed.

12. The combination of claim 10 wherein said dropping step includes rotating a respective straight arm while said hook arm remains fixed.

13. The combination of claim 10 wherein said dropping step includes rotating a respective support member to rotate hook arms fixed thereto in a downward direction and simultaneously rotating corresponding straight arms upwardly.

14. The combination of claim 10 wherein said dropping step includes rotating a respective support member to rotate hook arms fixed thereto in a downward direction and simultaneously rotating corresponding straight arms downwardly to a lesser extent.

* * * * *